(12) United States Patent
Huang et al.

(10) Patent No.: US 12,301,739 B2
(45) Date of Patent: May 13, 2025

(54) REVERSE WEBHOOK AUTHENTICATION

(71) Applicant: Stripe, Inc., San Francisco, CA (US)

(72) Inventors: Ji Huang, Bothell, WA (US); Yu-Ting Tsai, Richmond (CA)

(73) Assignee: Stripe, Inc., South San Francisco, CA (US)

( * ) Notice: Subject to any disclaimer, the term of this patent is extended or adjusted under 35 U.S.C. 154(b) by 336 days.

(21) Appl. No.: 18/086,626

(22) Filed: Dec. 21, 2022

(65) Prior Publication Data

US 2024/0214227 A1    Jun. 27, 2024

(51) Int. Cl.
*H04L 9/32* (2006.01)
*H04L 9/40* (2022.01)
*H04L 67/147* (2022.01)

(52) U.S. Cl.
CPC ............ H04L 9/3297 (2013.01); H04L 63/08 (2013.01); H04L 67/147 (2013.01)

(58) Field of Classification Search
CPC ... H04L 9/3297; H04L 63/08; H04L 63/0876; H04L 63/0884; H04L 63/0892; H04L 63/20; H04L 67/02; H04L 67/147
See application file for complete search history.

(56) References Cited

U.S. PATENT DOCUMENTS

| 2016/0092696 A1* | 3/2016 | Guglani | G06F 21/606 726/26 |
| 2023/0153426 A1* | 5/2023 | Grobelny | G06F 21/602 726/22 |
| 2024/0169057 A1* | 5/2024 | Marin | G06F 21/45 |

OTHER PUBLICATIONS

"Best practices for using webhooks," retrieved from https://stripe.com/docs/webhooks/best-practices, Mar. 2023, 5 pages.
"Check the webhook signatures," retrieved from https://stripe.com/docs/webhooks/signatures, Mar. 2023, 4 pages.

* cited by examiner

*Primary Examiner* — Kevin Bechtel
(74) *Attorney, Agent, or Firm* — BAKERHOSTETLER

(57) ABSTRACT

The disclosure generally describes one or more techniques for authenticating a webhook endpoint with a webhook server. Some techniques include a webhook server sending a seed with a webhook endpoint after the webhook endpoint is registered with the webhook server. In some examples, the webhook server generates the seed to send to the webhook endpoint and stores the seed with a key associated with the webhook endpoint. In such examples, the webhook server does not send data associated with the particular events to the webhook endpoint until the webhook endpoint acknowledges receipt of the seed while the seed is still valid.

20 Claims, 4 Drawing Sheets

REVERSE WEBHOOK AUTHENTICATION

TECHNICAL FIELD

The disclosure generally relates to software development.

BACKGROUND

Many applications utilize webhooks to communicate with each other by sending and detecting events, which can then trigger actions to be carried out. Webhooks also enable applications to automate processes and actions using workflows by performing a series of steps when certain conditions or events are detected.

SUMMARY

Current techniques that utilize webhooks often need to provide additional authentication to ensure that a webhook endpoint is not registered by a malicious third party and continuously receive information from the webhook server without needing to have continuous access to passwords and/or API keys. In some cases, the webhook server re-authenticates that the third party registered to the webhook endpoint can be trusted through the use of basic authentication, verification tokens, token authentication (e.g., OAuth), and/or webhook signatures. This disclosure provides a more secure way of utilizing webhooks such that a webhook server routinely authenticates the webhook endpoint to see if a webhook client associated with the webhook endpoint can be trusted. Routinely performing these checks allows the webhook server to close the communication channel when a determination is made that the webhook client cannot be trusted and allows the webhook server to ensure that the webhook client has the correct permissions and access to receive webhook events from the webhook server prior to sending event data to the webhook endpoint. For example, a technique is described where a webhook client authenticates its identity to the webhook server, where the authentication is pulled from the webhook client (e.g., instead of relying on the webhook client to self-authenticate with the webhook server). If the webhook client has been verified with the webhook server, the webhook server will continue to send events to the webhook endpoint. However, if the webhook endpoint cannot be authenticated, the webhook server will cease to continue to send events to the webhook endpoint.

In some embodiments, a method for authenticating one or more webhook endpoints is described. In some embodiments, the method comprises: sending, by a server, a first blocking authentication event including a first seed and an expiry timestamp to a webhook endpoint; prior to expiration of a predetermined time period based on the expiry timestamp, receiving, by the server, a first acknowledgement response from the webhook endpoint, wherein the first acknowledgement response includes the first seed and a key; in response to receiving the first acknowledgment response, authenticating, by the server, the webhook endpoint; generating, by the server, a second seed; sending, by the server, a first event with the second seed to the webhook endpoint; and receiving, by the server, a second acknowledgment response from the webhook endpoint, wherein the second acknowledgement response includes the second seed and the key.

In some embodiments, a non-transitory computer-readable storage medium storing one or more programs configured to be executed by one or more processors of a server is described. In some embodiments, the one or more programs includes instructions for: sending, by the server, a first blocking authentication event including a first seed and an expiry timestamp to a webhook endpoint; prior to expiration of a predetermined time period based on the expiry timestamp, receiving, by the server, a first acknowledgement response from the webhook endpoint, wherein the first acknowledgement response is associated with the first seed and a client key; in response to receiving the first acknowledgment response, authenticating, by the server, the webhook endpoint; generating, by the server, a second seed; sending, by the server, a first event with the second seed to the webhook endpoint; and receiving, by the server, a second acknowledgment response from the webhook endpoint, wherein the second acknowledgement response is associated with the second seed and the client key.

In some embodiments, a transitory computer-readable storage medium storing one or more programs configured to be executed by one or more processors of a server is described. In some embodiments, the one or more programs includes instructions for: sending, by the server, a first blocking authentication event including a first seed and an expiry timestamp to a webhook endpoint; prior to expiration of a predetermined time period based on the expiry timestamp, receiving, by the server, a first acknowledgement response from the webhook endpoint, wherein the first acknowledgement response is associated with the first seed and a client key; in response to receiving the first acknowledgment response, authenticating, by the server, the webhook endpoint; generating, by the server, a second seed; sending, by the server, a first event with the second seed to the webhook endpoint; and receiving, by the server, a second acknowledgment response from the webhook endpoint, wherein the second acknowledgement response is associated with the second seed and the client key.

In some embodiments, a computer system is described. In some embodiments, the computer system comprises one or more processors and memory storing one or more program configured to be executed by the one or more processors. In some embodiments, the one or more programs includes instructions for: sending, by the server, a first blocking authentication event including a first seed and an expiry timestamp to a webhook endpoint associated with a client; prior to expiration of a predetermined time period based on the expiry timestamp, receiving, by the server, a first acknowledgement response from the webhook endpoint, wherein the first acknowledgement response is associated with the first seed and an endpoint key; in response to receiving the first acknowledgment response, authenticating, by the server, the webhook endpoint; generating, by the server, a second seed; sending, by the server, a first event with the second seed to the webhook endpoint; and receiving, by the server, a second acknowledgment response from the webhook endpoint, wherein the second acknowledgement response is associated with the second seed and the endpoint key.

In some embodiments, a computer system is described. In some embodiments, the computer system includes: means for sending, by a server, a first blocking authentication event including a first seed and an expiry timestamp to a webhook endpoint associated with a client; prior to expiration of a predetermined time period based on the expiry timestamp, means for receiving, by the server, a first acknowledgement response from the webhook endpoint, wherein the first acknowledgement response is associated with the first seed and an endpoint key; in response to receiving the first acknowledgment response, means for authenticating, by the server, the webhook endpoint; means for generating, by the server, a second seed; means for sending, by the server, a first event with the second seed to the webhook endpoint; and means for receiving, by the server, a second acknowledgment response from the webhook endpoint, wherein the second acknowledgement response is associated with the second seed and the endpoint key.

In some embodiments, a computer program product is described. In some embodiments, the computer program product comprises one or more programs configured to be executed by one or more processors of a computer system. In some embodiments, the one or more programs includes instructions for: sending, by a server, a first blocking authentication event including a first seed and an expiry timestamp to a webhook endpoint associated with a client; prior to expiration of a predetermined time period based on the expiry timestamp, receiving, by the server, a first acknowledgement response from the webhook endpoint, wherein the first acknowledgement response is associated with the first seed and an endpoint key; in response to receiving the first acknowledgment response, authenticating, by the server, the webhook endpoint; generating, by the server, a second seed; sending, by the server, a first event with the second seed to the webhook endpoint; and receiving, by the server, a second acknowledgment response is associated with the second seed and the endpoint key.

Executable instructions for performing these functions are, optionally, included in a non-transitory computer readable storage medium or other computer program product configured for execution by one or more processors. Moreover, details of one or more examples, implementations, and/or embodiments are set forth in the accompanying drawings and the description below. Other components, features, aspects, and potential advantages will be apparent from the description and drawings, and from the claims.

BRIEF DESCRIPTION OF THE FIGURES

For a better understanding of the various described embodiments, reference should be made to the Detailed Description below in conjunction with the following figures in which like reference numerals refer to corresponding parts throughout the figures.

DETAILED DESCRIPTION

The detailed description described below describes various examples with reference to the accompanying drawings. Some, but not all, examples are shown and described herein. Indeed, the examples can take many different forms and/or be augmented in many different ways. Accordingly, this disclosure should not be construed as limited to the examples set forth herein. Rather, these examples are provided so that this disclosure will satisfy applicable legal requirements.

Figure 1:
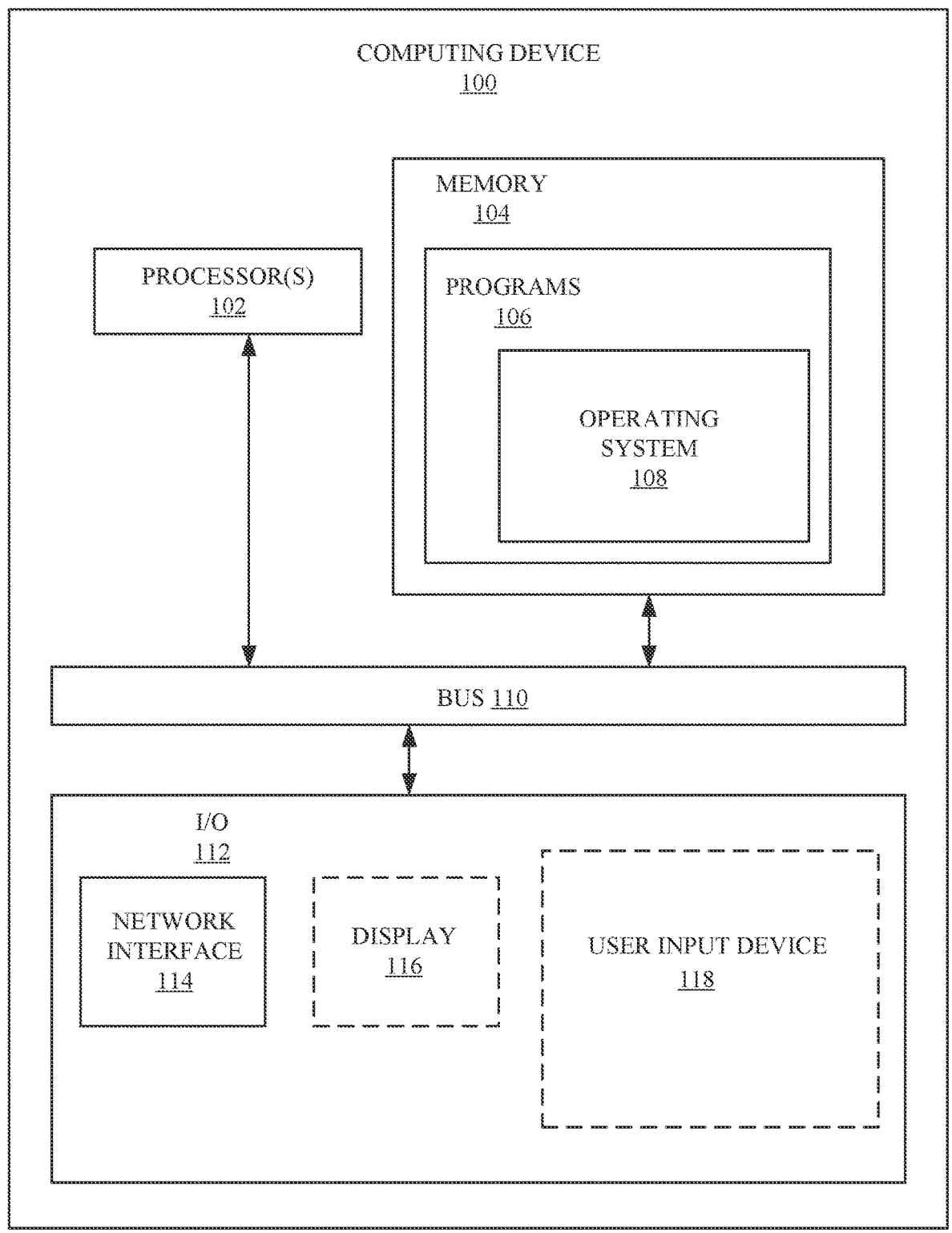
FIG. 1 is a block diagram of a computing device that implements one or more processes in accordance with one or more embodiments described herein.

FIG. 1 illustrates an example computing device 100 (alternatively referred to as computing system 100, computer system 100, system 100, or device 100) that can be used to support and/or implement the architecture and operations in accordance with one or more embodiments described herein. It will be apparent to those of ordinary skill in the art, however, that other alternative systems of various system architectures can also be used. For example, the other alternative systems can be a computing system with fewer, different, and/or additional components than those illustrated in FIG. 1 or a computing system including multiple computing devices 100. In some embodiments, computing device 100 is a general-purpose computer. In some embodiments, computing device 100 is a special purpose (e.g., application specific) hardware device.

Computing device 100 illustrated in FIG. 1 includes one or more bus (or other internal communication component) 110 for communicating information, and one or more processors 102 coupled to the bus 110 for processing information. Device 100 includes memory 104 coupled to bus 110. Memory 104 can include random access memory (RAM) or other volatile storage device for storing information and instructions to be executed by one or more processors 102, and/or for storing temporary variables or other intermediate information during execution of instructions by one or more processors 102. Memory 104 can also include non-volatile memory storage, such as read-only memory (ROM) and/or a static storage device for storing static information and instructions for processors 102, and one or more data storage devices such as a hard disk (e.g., magnetic disk), flash memory storage, or optical disk and its corresponding disk drive. This data storage device can be coupled to bus 110 for storing information and instructions. For example, memory 104 can store programs 106 in non-volatile memory, the programs including one or more sets of computer-executable instructions for execution by the one or more processors 102. When ready for execution, the instructions are loaded into volatile memory and passed the processors for execution. Programs 106 can include operating system 108 for managing the computing device's basic functionality, such as scheduling tasks, executing applications, and controlling peripherals. As used herein, the term "program" or "computer program" are considered synonymous with "application," "computer application, or "application component" unless otherwise stated in the context in which the term is used.

Computing device 100 can also include input/output (I/O) component 112. FIG. 1 illustrates several example I/O components grouped together within I/O component 112 for illustration purposes only, and each such component therein does not necessarily need to be located together, or within any part of computing device 100. For example, I/O component 112 can be an external device coupled to an interface of device 100. Computing device 100 can include one or more network interfaces 114 for handling uplink and/or downlink communications with one or more other devices. The network interface 114 can itself be a communication device and can include any of a number of commercially available networking peripheral devices such as those used for coupling to an Ethernet connection, Wi-Fi connection, 3GPP mobile communication protocol (e.g., 3G, 4G, LTE, 5G, NR, and/or the like), and/or the like, for communication over the Internet, a wide area network, a local area network, an ad-hoc (device-to-device network), or the like. Network interface 114 can be a modem connection, and/or any other mechanism that provides connectivity between computing device 100 and one or more other devices. Note that any or all of the components of this system illustrated in FIG. 1 and associated hardware can be used in various embodiments as discussed herein.

Computing device 100 can optionally be coupled to one or more display device 116, such as a light emitting diode (LED) display or a liquid crystal display (LCD) (e.g., coupled through bus 110 for displaying information to a user of computing device 100). Display device 116 can be integrated into computing device 100 (e.g., a touchscreen of a smartphone) or be external to computing device 100 (e.g., an external display coupled via a cable with device 100).

Computing device 100 can optionally include user input device 118, such as an alphanumeric input device (e.g., keyboard), a cursor control or other input signaling device (e.g., a touch-sensitive display (touchscreen), a touchpad, mouse, a trackball, stylus, or cursor direction keys) for controlling cursor movement and/or selection on a user interface displayed using display device 116.

In some embodiments, computing device 100 is a server or system of servers. For example, the server can be a collection of one or more computer hardware machines working together to perform processes and tasks described with respect to computing device 100. Thus, computing device 100 can be considered a logical construct, and references thereto can and should be interpreted as encompassing scope that includes computing device 100 being comprised of one or more computing devices (e.g., as device 100 is described) or several devices that together behave as computing device 100 has been described. As one of skill would appreciate, there is no requirement express or implied herein that the components of computing device 100 be dedicated or physical resources, or that the components must be located physically together. Rather, computing device 100 can be embodied in one or more virtual machines and/or certain functional components of computing device 100 can be remote from other functional components of device 100.

With the above description in mind, attention is now turned towards techniques for a webhook server to authenticate a webhook endpoint of a webhook client. Such authentication can be used by the webhook server to determine when to notify the webhook endpoint of events. It should be recognized that while this description refers to sending events, data associated with events detected by the webhook server can be sent. For example, the webhook server can detect that an event occurred that is registered to the webhook endpoint and, as a result, send an indication of the event and/or an identification of a user associated with the event to the webhook endpoint.

Some techniques described herein include a webhook server sending a seed with a webhook endpoint after the webhook endpoint is registered to receive events from the webhook server. The webhook server generates the seed to send to the webhook endpoint and stores the seed with a key associated with the webhook endpoint (e.g., an endpoint key corresponding to the webhook endpoint, a client key corresponding to the webhook client, and/or any other key). Using such techniques, the webhook server does not send events to the webhook endpoint until the webhook endpoint acknowledges receipt of the seed while the seed is still valid (e.g., a seed is only valid for a particular amount of time and/or until the webhook server designates a seed as invalid). In some examples, the webhook server continues to generate new seeds and send those new seeds to the webhook endpoint over time. Based on the webhook endpoint acknowledging receipt of a valid seed (e.g., sending a message to the webhook server with a valid seed and the key associated with the webhook endpoint), the webhook server authenticates the webhook endpoint and configures the webhook server to send events (e.g., events detected before and/or after the webhook server authenticates the webhook endpoint) to the webhook endpoint while the webhook endpoint is authenticated. In some examples, the webhook endpoint must acknowledge receipt of events from the webhook server with a message that includes a valid seed (e.g., a seed that has not expired and/or been designated by the webhook server as invalid) and the key associated with the webhook endpoint. In such examples, the webhook endpoint re-authenticates and/or maintains authentication when the webhook endpoint acknowledges receipt with a valid seed and the key associated with the endpoint. In some examples, the webhook server un-authenticates the webhook endpoint when the webhook server receives an acknowledgement with an invalid seed. In such examples, the webhook server requires the webhook endpoint to be re-authenticated (e.g., using one or more techniques described above) before continuing to send events to the webhook endpoint.

Figure 2A:
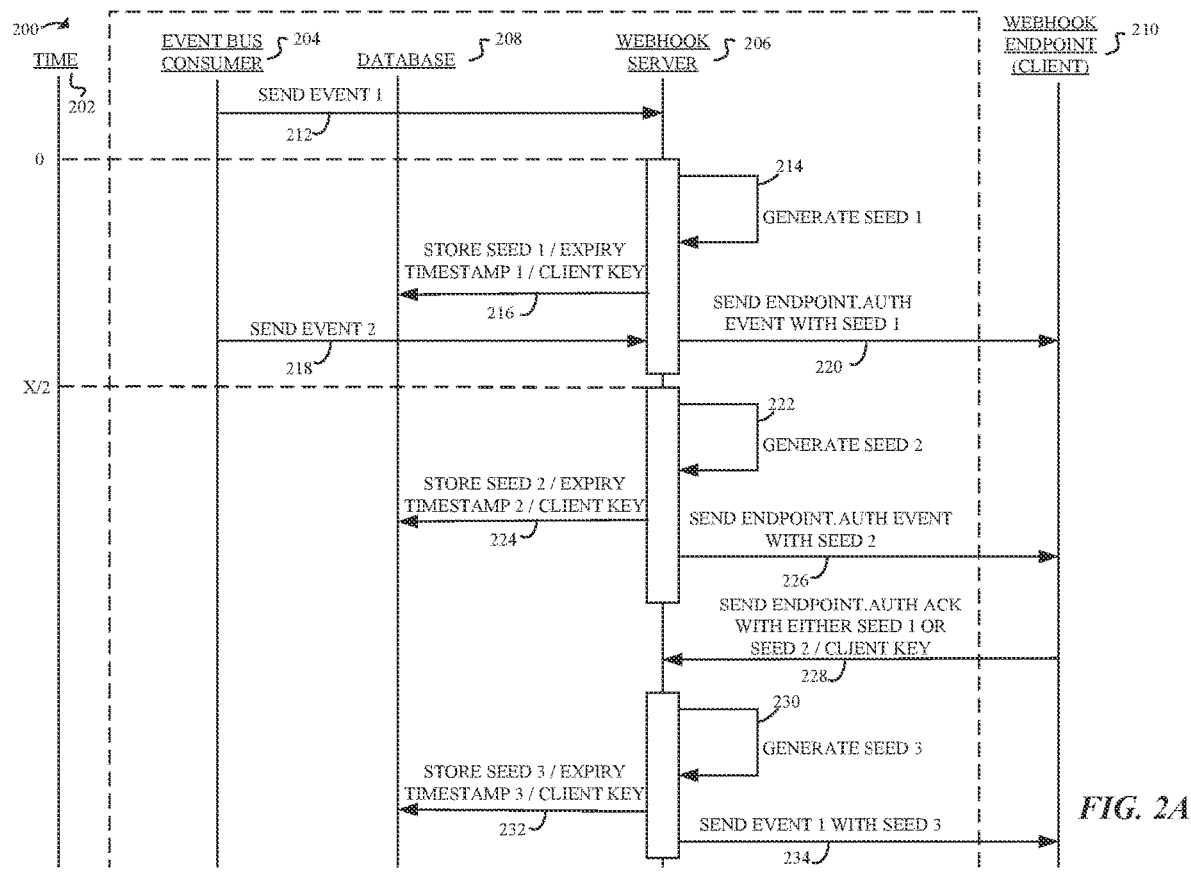
FIGS. 2A-2B are a swim lane diagram for authenticating a webhook endpoint in accordance with one or more embodiments described herein.
Figure 2B:
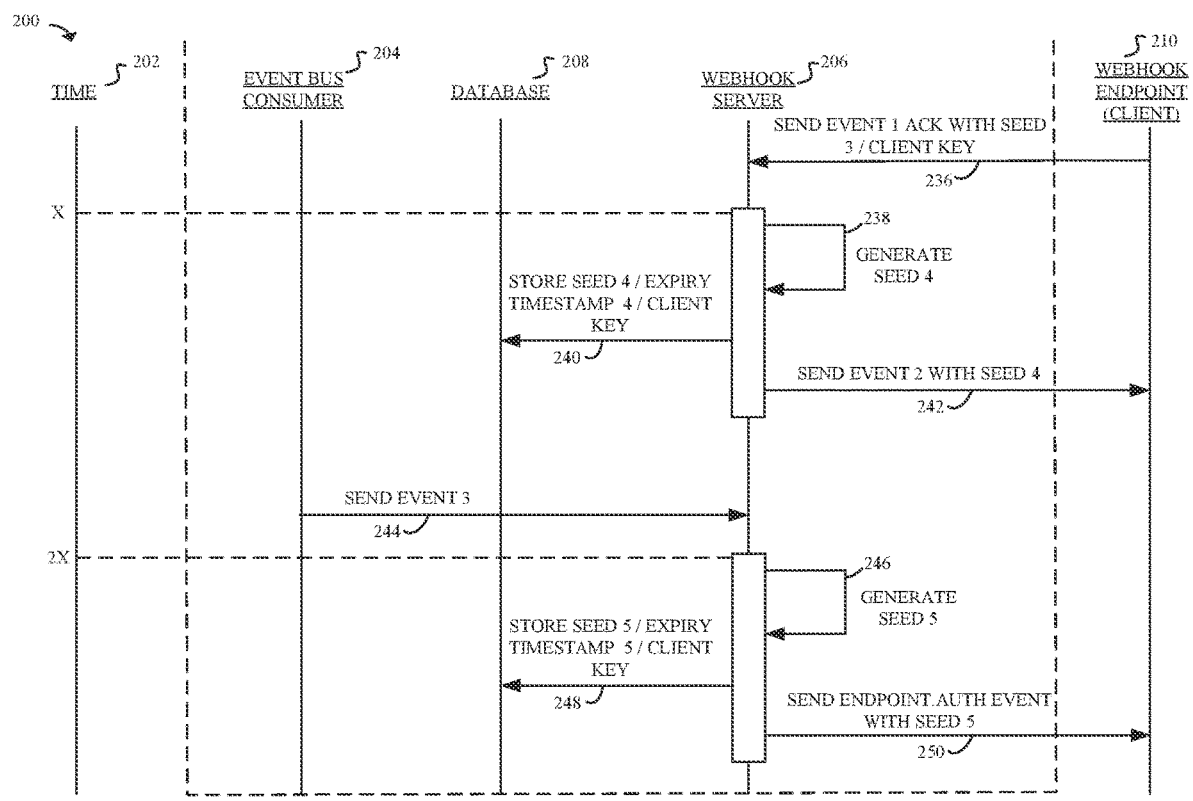

FIGS. 2A-2B are a swim lane diagram (e.g., swim lane diagram 200) for authenticating webhook endpoint 210 in accordance with one or more embodiments described herein. It should be understood that the description provided below in relation to FIGS. 2A-2B is merely exemplary, and one of ordinary skill in the art could make modifications in view of this disclosure to achieve similar outcomes.

As illustrated in FIGS. 2A-2B, swim lane diagram 200 includes four entities: event bus consumer 204, webhook server 206, database 208, and webhook endpoint 210. In some examples, event bus consumer 204 detects, stores, and/or sends events to other components. For example, event bus consumer 204 can receive events that occur and forward the events to webhook server 206 for distribution. In some examples, webhook server 206 registers, authenticates, un-authenticates, and/or re-authenticates webhook endpoints for the purpose of communicating events (e.g., received from event bus consumer 204 and registered to a particular webhook endpoint) to the webhook endpoints. In some examples, database 208 stores data, such as data used by webhook server 206. In such examples, database 208 can be in communication with and/or part of webhook server 206. Similarly, event bus consumer 204 can also be in communication with and/or part of webhook server 206. In some examples, webhook endpoint 210 is an address of a webhook client (e.g., a URL that is associated with the webhook client). In such examples, webhook endpoint 210 can be one address of many for the webhook client such that webhook server 206 (or another computer system) can communicate different data to different addresses (e.g., different webhook endpoints) of the webhook client.

To help with understanding of swim lane diagram 200, an example will be described using a payment server as webhook server 206 and a merchant application as a webhook client (sometimes referred to as a client) with one or more webhook endpoints including webhook endpoint 210.

In FIG. 2A, the merchant application has registered an associated webhook endpoint (e.g., webhook endpoint 210) with the payment server (e.g., webhook server 206) after the merchant application has been authenticated with the payment server. In particular, swim lane diagram 200 starts with the associated webhook endpoint already registered but not yet authenticated with the payment server.

In some examples, the associated webhook endpoint is registered with the payment server by the merchant application while the merchant application is authenticated with (e.g., logged into an account of) the payment server. Such registration can include identifying events of a particular type and configuring the payment server to send events of the particular type (e.g., when such events are detected by the payment server) to the associated webhook endpoint while the associated webhook endpoint is authenticated with the payment server. In some examples, the registration includes the merchant application establishing a key (e.g., an endpoint key corresponding to webhook endpoint 210, a client key corresponding to the merchant application, and/or any other key) with the payment server. It should be recognized that the key is optional in techniques described herein, though the key can provide additional security and/or verification with an authentication process, as described further below. In some examples, authentication of the associated webhook endpoint requires the payment server to generate and send a seed to the associated webhook endpoint. In such examples, until the associated webhook endpoint acknowledges receipt of the seed to the payment server, the associated webhook endpoint is not authenticated with the payment server and accordingly does not receive events from the payment server.

At 214, authentication of the associated webhook endpoint starts with the payment server generating a seed (e.g., seed 1) to send to the associated webhook endpoint. The seed can be associated with an expiration time (referred to as an expiry timestamp in FIGS. 2A-2B) that indicates when the seed expires and is no longer valid to authenticate (and/or re-authenticate and/or maintain authentication of) the associated webhook endpoint. The expiration of a seed can discourage webhook endpoints from persisting seeds locally and relying on in-memory state. As illustrated in FIG. 2A at 216, the payment server stores the seed (e.g., seed 1) in database 208 with the expiration time (e.g., expiry timestamp 1) and the key (e.g., the key described above, referred to as client key in FIG. 2A). For purposes of this example, time X is the expiration time for seed 1. In some embodiments, the server stores the seed along with the key in order to track which seeds can be used to authenticate the client. In some embodiments, expired seeds are removed.

In some examples, the payment server sends the seed to the associated webhook endpoint, such as in an endpoint authorization message (referred to as endpoint.auth event in FIG. 2A at 220). In such examples, the seed can be sent before or after the payment server stores the seed in database 208. In some examples, the endpoint authorization message further includes the expiration time for the seed (e.g., expiry timestamp 1). In other examples, the expiration time for the seed is determined by the associated webhook endpoint based on a timestamp of the endpoint authorization message. A non-limiting example of the endpoint authorization message is provided below.
{
    "id": "evt_234",
    "type": "endpoint.authenticate",
    "created": 1530291411
    "reason": {
        "type": "system",
    },
    "delivery": {
        "destination_id": "ed_123"
        "resent": false,
        "seed": "abcdefg",
        "seed_expires_at": "12/1/2023"
    },
}
In some examples, the payment server receives and/or detects multiple events before sending seed 1 to the associated webhook endpoint. For example, FIG. 2A illustrates that the payment server receives event 1 at 212 (e.g., a payment processed by John) and event 2 at 218 (e.g., a payment processed by Jane) before sending seed 1 to the associated webhook endpoint. It should be recognized that receiving multiple events before sending seed 1 is just an example and, in some examples, the payment server can receive only 1 or 0 events before sending seed 1 to the associated webhook endpoint. In some examples, the payment server initiates authentication of the associated webhook endpoint in response to receiving an event. In other examples, the payment server initiates authentication of the associated webhook endpoint after the associated webhook endpoint is registered without regard to receiving an event.

After sending seed 1 to the associated webhook endpoint, the associated webhook endpoint is not authenticated with the payment server until the associated webhook endpoint acknowledges receipt of seed 1. In some examples, without regard to whether the associated webhook endpoint is authenticated with the payment server, the payment server can generate and send one or more additional seeds to the associated webhook endpoint. Such additional seeds can expire later than previous seeds, allowing for the associated webhook endpoint to acknowledge receipt of events after the expiration of previous seeds. In some examples, additional seeds can be sent when the associated webhook endpoint has been authenticated and/or an expiration time for a previous seed is approaching (e.g., when half of the expiration time has passed). As illustrated in FIG. 2A, the payment server generates another seed (e.g., seed 2) at 222 and stores seed 2 in database 208 at 224. In some examples, seed 2 is stored in database 208 with an expiration time (e.g., expiry timestamp 2) and the same key that was stored with seed 1. In such examples, expiry timestamp 2 can be later than expiry timestamp 2 (e.g., the same length of time as expiry timestamp 1 was from seed 1 but starting at a time associated with seed 2). For purposes of this example, time 3X/2 is the expiration time for seed 2 (e.g., X time later than when seed 2 is generated and/or sent to the associated webhook endpoint). Similar to as described above with respect to seed 1, the payment server sends seed 2 in an endpoint authorization message (e.g., at 226).

After receiving the endpoint authorization message (e.g., at 220 or 226), the associated webhook endpoint can acknowledge receipt of the endpoint authorization message by sending an acknowledgement to the payment server. The acknowledgement can include the seed that the associated webhook endpoint is acknowledging along with the key registered for the associated webhook endpoint. For example, The acknowledgement can include seed 1 when acknowledging the endpoint authorization message of 220 and seed 2 when acknowledging the endpoint authorization message of 226. In some examples, the associated webhook endpoint selects which seed to include in an acknowledgement based on a current time relative to an expiration time of a seed, such that the associated webhook endpoint selects the seed with an expiration time the longest from a current time. Along these lines, swim lane diagram 200 illustrates at 228 that the associated webhook endpoint sends an acknowledgement to an endpoint authorization message (referred to as endpoint.auth ack) with either seed 1 or seed 2 (e.g., because the expiration time has not been reached for either seed 1 or seed 2). In some examples, the associated webhook endpoint can include both seeds in the acknowledgement.

After the payment server receives an acknowledgement of an endpoint authorization message, the payment server can check that a seed included in the acknowledgement is valid (e.g., has not expired and/or been designated as invalid by the payment server). For example, after 228 and before time X, both seed 1 and seed 2 are valid and receipt of either would cause the payment server to authenticate the associated webhook endpoint. For another example, after 228, after time X, and before time 3X/2, receipt of seed 1 and not seed 2 would cause the payment server to authenticate the associated webhook endpoint. In some examples, the payment server uses the seed and the key to check whether to authenticate the associated webhook endpoint (e.g., to allow duplicate seeds for different endpoints when the keys are different).

In some examples, the payment server continues to generate seeds even after the associated webhook endpoint has been authenticated with the payment server. Such seeds can be generated to allow the associated webhook endpoint to re-authenticate and/or maintain authentication after an expiration time for a previous seed has expired. For example, at 230, the payment server generates a new seed (e.g., seed 3) and, at 232, the payment server stores seed 3 with an expiration time for seed 3 (referred to as expiry timestamp 3 in FIG. 2A) and the key in database 208. In some examples, during the time when multiple seeds are valid (e.g., a previous seed has not expired yet and a new seed has been received), all seeds that are still valid can be sent from the associated webhook endpoint to the payment server to authenticate, re-authenticate, and/or maintain authentication of the associated webhook endpoint.

In some examples, the payment server is configured to send events to the associated webhook endpoint while the associated webhook endpoint is authenticated with the payment server. Such events can be received by the payment server either before, during, or after the associated webhook endpoint is authenticated with the payment server. For example, at 234 in FIG. 2A, swim lane diagram 200 illustrates that the payment server sends event 1 (which was received at 212 before the associated webhook endpoint was authenticated) to the associated webhook endpoint. In some examples, event 1 is sent with seed 3 (e.g., a most recent seed generated by the payment server) and, optionally, an expiration time for seed 3. Notably, seed 3 was not included in an endpoint authorization message but instead is first sent to the associated webhook endpoint with an event. First sending new seeds with an event (e.g., while the associated webhook endpoint is already authenticated) allows for the payment server to update seeds being used (and thus the expiration time) without requiring an endpoint authorization message to be sent.

Once the associated webhook endpoint has received one or more seeds from the payment server, the associated webhook endpoint can acknowledge events received from the payment server with a valid seed and the key to continue to authenticate the associated webhook endpoint with the payment server. For example, after receiving event 1 from the payment server, the associated webhook endpoint can acknowledge receiving event 1 to re-authenticate and/or maintain authentication with the payment server. In some examples, if the associated webhook endpoint fails to send the acknowledgement within a predefined period of time, the payment server will determine that event 1 was not delivered to the associated webhook endpoint and proceed based on re-try criteria for the associated webhook endpoint. For example, the payment server can re-send event 1 a particular number of times (e.g., 1-10) when not receiving an acknowledgement within the predefined period of time. In other examples, the payment server can forgo re-sending event 1. At 236 in FIG. 2B, swim lane diagram 200 illustrates that the associated webhook endpoint sends an acknowledgement of event 1 with seed 3 and the key. In some examples, the acknowledgement could be sent with seed 1, seed 2, and/or seed 3 as all three seeds have not expired at 236.

While the associated webhook endpoint remains authenticated, the payment server will continue to generate new seeds and send events to the associated webhook endpoint. For example, the payment server generates seed 4 at 238, stores seed 4 with an expiration time (e.g., expiry timestamp 4) and the key at 240, and sends event 2 with seed 4 to the associated webhook endpoint at 242.

As mentioned above, while the associated webhook endpoint is authenticated with the webhook server, the payment server can determine to un-authenticate the associated webhook endpoint.

In some examples, the payment server un-authenticates the associated webhook endpoint when the payment server fails to receive an acknowledgement of a seed before the seed expires and there are no other seeds that are still unexpired. For example, in FIG. 2B, the payment server does not receive an acknowledgement of seed 4 before seed 4 expires at time 2X. In some examples, this provides an extra layer of security in case one of the seeds is compromised.

In other examples, the payment server un-authenticates the associated webhook endpoint when the payment server receives an acknowledgement with an invalid seed (e.g., a seed that has already expired or a seed that was not established for the associated webhook endpoint).

Once the payment server detects a failure (e.g., by receiving an invalid seed and/or not receiving an acknowledgement of at least one pending seed before expiration of all pending seeds), the payment server can restart the authentication process described above, such as by sending a new endpoint authorization message. For example, the payment server generates a seed (e.g., seed 5) at 246, stores seed 5 with an expiration time (e.g., expiry timestamp 5) and the key at 248, and sends an endpoint authorization message with seed 5 at 250. In some examples, un-authenticating the associated webhook endpoint causes the payment server to no longer send events (sometimes referred to as blocking sending of events) to the associated webhook endpoint until the associated webhook endpoint is authenticated again. Instead of sending events, the payment server can collect and/or aggregate the events, similar to as done before the associated webhook endpoint was authenticated for the first time. An example of blocking an event is event 3 at 244, where event 3 is received by the payment server and not sent to the associated webhook endpoint until the associated webhook endpoint is re-authenticated via techniques described above. In some examples, events that have been blocked for longer than a delivery threshold period (e.g., 5 minutes or a predefined duration) will be dropped and not be sent to the associated webhook endpoint when the associated webhook endpoint re-authenticates with the payment server.

Figure 3:
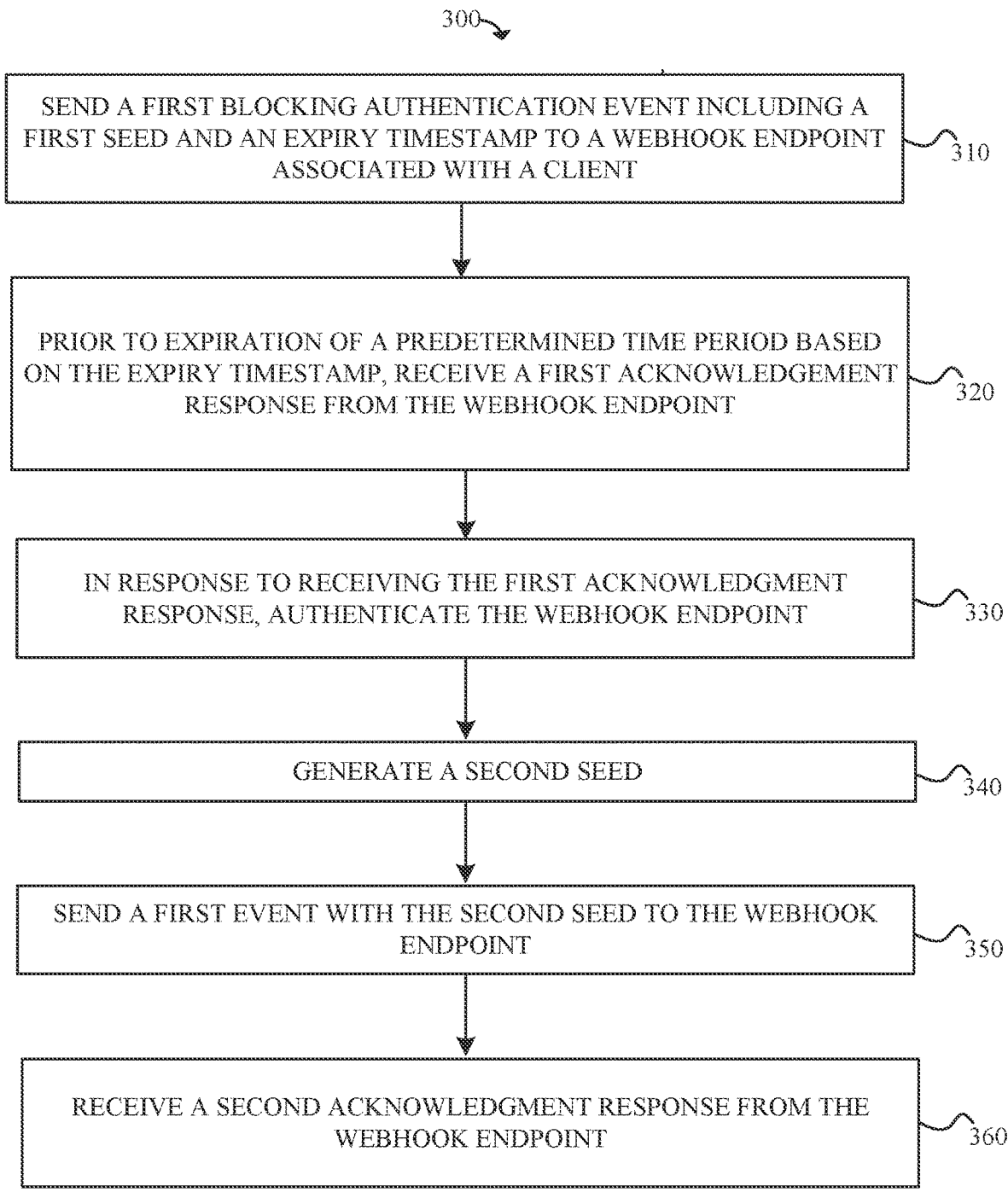
FIG. 3 is a flow diagram illustrating a method for authenticating one or more webhook endpoints in accordance with one or more embodiments described herein.

FIG. 3 is a flow diagram illustrating a method for authenticating one or more webhook endpoints in accordance with one or more embodiments described herein. Method 300 can be performed by one or more components described herein, including computing device 100 and/or webhook server 206.

At block 310, a server (e.g., a webhook server) sends, to a webhook endpoint (e.g., an associated webhook endpoint and/or webhook endpoint 210), a first authentication event (e.g., an endpoint authorization message, a first blocking authentication event, an authentication request, an HTTP POST request, and/or an event represented using JSON objects) including a first seed (e.g., a hash, a number, a value, and/or a cryptographic nonce) and/or an expiry timestamp (e.g., an expiration time, a Unix timestamp, and/or another type of timestamp). In some embodiments, the webhook endpoint is associated with a client (e.g., a webhook client, computer device 100, and/or a merchant application) (e.g., at 226).

At block 320, prior to (e.g., before) expiration of a predetermined time period based on the expiry timestamp, the server receives, from the webhook endpoint, a first acknowledgement response (e.g., the acknowledgement of the endpoint authorization message) (e.g., at 228). In some examples, the first acknowledgement response is associated with (e.g., encrypted using, signed using, and/or includes) the first seed and/or a key (e.g., an endpoint key, a client key, a public key, a private key, an API key, and/or a client API key). In some embodiments, the key corresponds to the webhook endpoint.

At block 330, in response to receiving the first acknowledgment response, the server authenticates the webhook endpoint (e.g., and not other webhook endpoints of the client). In some embodiments, the server authenticates the webhook endpoint if the acknowledgement response is associated with (e.g., encrypted using, signed using, and/or includes) the first seed (and, in some embodiments, also associated with the key). In some embodiments, the server does not authenticate the webhook endpoint if the acknowledgement response is not associated with (e.g., encrypted using, signed using, and/or includes) the first seed and/or not associated with (e.g., encrypted using, signed using, and/or includes) another seed that was generated by the server that has not expired. In some examples, the webhook endpoint is authenticated based on receiving an acknowledgement response (e.g., the first acknowledgement response) with a valid seed (e.g., the first seed) and the key.

At block 340, the server generates a second seed (e.g., 230). In some embodiments, the server generates the second seed before the first seed has expired. In some embodiments, the first seed and the second seed are different (e.g., have different values).

At block 350, the server sends, to the webhook endpoint, a first event with the second seed (e.g., 234). In some embodiments, the server sends the first event with the second seed to the webhook endpoint via a communication protocol and/or via the internet. In some embodiments, the server sends the first event with the first seed if the first seed is not expired.

At block 360, the server receives, from the webhook endpoint, a second acknowledgment response that is associated with (e.g., encrypted using, signed using, and/or includes) the second seed and/or the key (e.g., 236). In some embodiments, the second acknowledgment response is different from the first acknowledgment response. In some embodiments, the second acknowledgment response is associated with (e.g., encrypted using, signed using, and/or includes) the first seed and not the second seed.

In some embodiments, the server generates a third seed (e.g., in response to not receiving the first acknowledgement response from the webhook endpoint during the predetermined time period based on the expiry timestamp). In some embodiments, the server sends a second authentication event including the third seed and/or the expiry timestamp to the webhook endpoint. In some embodiments, in response to receiving a third acknowledgement response associated with (e.g., encrypted using, signed using, and/or includes) the first or the third seed, the server authenticates the webhook endpoint. In some embodiments, before receiving the first acknowledgement response from the webhook endpoint, the server forgoes sending the first event.

In some embodiments, the first seed has a first amount of time before expiration, the second seed has a second amount of time before expiration that is more than the first amount of time before expiration, and the first event with the second seed is sent to the webhook endpoint before the first amount of time before expiration is less than or equal to zero.

In some embodiments, the server receives, from the webhook endpoint, a third acknowledgment response that is associated with (e.g., encrypted using, signed using, and/or includes) the second seed and/or the key (e.g., while the webhook endpoint is authenticated by the webhook endpoint). In some embodiments, in response to determining that the second seed is invalid (e.g., was not generated by the server, has expired, and/or was not sent to the webhook endpoint by the server), the server initiates a process to re-authenticate the webhook endpoint with the server; and blocks one or more events that have occurred until the webhook endpoint is authenticated with the server.

In some embodiments, while blocking the one or more events, the server removes a respective set of events from the one or more events, wherein a delivery period (e.g., a period in which a respective event must be delivered to the webhook endpoint and/or sent by the server before the respective event is removed or does not get sent to the webhook endpoint when the webhook endpoint is re-authenticated) for each of the respective set of events has expired.

In some embodiments, at a predetermined period of time after the webhook endpoint was authenticated with the server, the server sends, to the webhook endpoint, a first request to re-authenticate with the server, wherein the first request includes a first set of data. In some embodiments, after sending, to the webbook endpoint, the first request to re-authenticate with the server, the server detects that a first event has occurred; and in conjunction with determining that a first set of one or more criteria has been satisfied, sends data corresponding to the first event to the webhook endpoint, where: the first set of one or more criteria includes a criterion that is satisfied when an acknowledgement of the first request has been received from the webhook endpoint; and the data (e.g., webhook event) corresponding to the first event to the webhook endpoint is not sent in conjunction with determining that the acknowledgement of the first request has not been received from the webhook endpoint. In some embodiments, the first set of data is associated with a key (e.g., a client API key) and/or the first seed (and/or token) that was generated before the request was sent. In some embodiments, the acknowledgement is associated with the first set of data being sent with an acknowledgement (e.g., seed with the key in the header of the response). In some embodiments, the server generates a second request to re-authenticate that includes second data that is different from the first data. In some embodiments, the second set of data is sent with a different seed (e.g., a seed that has not expired and/or a seed that is different from the first seed) and the same key (e.g., before/after acknowledgement of first request received and after a predetermined period of time after sending the first request) as the first set of data. In some embodiments, a second seed has a different expiry timestamp than the first seed and is generated before the first seed expires. In some embodiments, the first set of one or more criteria includes a criterion that is met when the acknowledgement is received during a first period of time that is based on at least a portion of the first data (e.g., expiry timestamp). In some embodiments, if the server receives a seed that has expired and/or does not receive an acknowledgement to one or more events that is associated with a valid seed (e.g., a seed that has not expired and/or a seed that was generated by the server), the server generates one or more new seeds and attempts to reauthenticate with the webhook endpoint using the newly generated seeds.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described to best explain the principles and practical applications of the various embodiments, to thereby enable others skilled in the art to best utilize the various embodiments with various modifications as may be suited to the particular use contemplated.

What is claimed is:

1. A method for authenticating one or more webhook endpoints, comprising:
    sending, by a server, a first blocking authentication event including a first seed and an expiry timestamp to a webhook endpoint;
    prior to expiration of a predetermined time period based on the expiry timestamp, receiving by the server, a first acknowledgement response from the webhook endpoint, wherein the first acknowledgement response includes the first seed and a key;
    in response to receiving the first acknowledgment response, authenticating, by the server, the webhook endpoint;
    generating, by the server, a second seed;
    sending, by the server, a first event with the second seed to the webhook endpoint; and
    receiving, by the server, a second acknowledgment response from the webhook endpoint, wherein the second acknowledgement response includes the second seed and the key.

2. The method of claim 1, further comprising:
    generating, by the server, a third seed;
    sending, by the server, a second authentication event including the third seed and the expiry timestamp to the webhook endpoint; and
    in response to receiving a third acknowledgement response including the first or the third seed, authenticating, by the server, the webhook endpoint.

3. The method of claim 1, further comprising:
    before receiving, by the server, the first acknowledgement response from the webhook endpoint, forgoing sending the first event.

4. The method of claim 1, wherein:
    the first seed has a first amount of time before expiration,
    the second seed has a second amount of time before expiration that is more than the first amount of time before expiration, and
    the first event with the second seed is sent to the webhook endpoint before the first amount of time before expiration is less than or equal to zero.

5. The method of claim 1, further comprising:
    while the webhook endpoint is authenticated by the server, receiving, by the server, a third acknowledgment response that includes the second seed and the key; and
    in response to determining that the second seed is invalid:
        initiating a process to re-authenticate the webhook endpoint with the server; and
        blocking one or more events that have occurred until the webhook endpoint is re-authenticated with the server.

6. The method of claim 5, further comprising:
    while blocking the one or more events, removing, by the server, a respective set of events from the one or more events, wherein a delivery period for each of the respective set of events has expired.

7. The method of claim 1, wherein the key corresponds to the webhook endpoint.

8. The method of claim 1, wherein the webhook endpoint is authenticated based on receiving an acknowledgement response with a valid seed and the key.

9. A non-transitory computer-readable storage medium storing one or more programs configured to be executed by one or more processors of a server, the one or more programs including instructions for:
    sending, by the server, a first blocking authentication event including a first seed and an expiry timestamp to a webhook endpoint;
    prior to expiration of a predetermined time period based on the expiry timestamp, receiving, by the server, a first acknowledgement response from the webhook endpoint, wherein the first acknowledgement response is associated with the first seed and a client key;
    in response to receiving the first acknowledgment response, authenticating, by the server, the webhook endpoint;
    generating, by the server, a second seed;
    sending, by the server, a first event with the second seed to the webhook endpoint; and
    receiving, by the server, a second acknowledgment response from the webhook endpoint, wherein the second acknowledgement response is associated with the second seed and the client key.

10. The non-transitory computer-readable storage medium of claim 9, wherein the one or more programs further include instructions for:
    generating, by the server, a third seed;
    sending, by the server, a second authentication event including the third seed and the expiry timestamp to the webhook endpoint; and
    in response to receiving a third acknowledgement response associated the first or the third seed, authenticating, by the server, the webhook endpoint.

11. The non-transitory computer-readable storage medium of claim 9, wherein the one or more programs further include instructions for:
    before receiving, by the server, the first acknowledgement response from the webhook endpoint, forgoing sending the first event.

12. The non-transitory computer-readable storage medium of claim 9, wherein:
    the first seed has a first amount of time before expiration,
    the second seed has a second amount of time before expiration that is more than the first amount of time before expiration, and
    the first event with the second seed is sent to the webhook endpoint before the first amount of time before expiration is less than or equal to zero.

13. The non-transitory computer-readable storage medium of claim 9, wherein the one or more programs further include instructions for:

while the webhook endpoint is authenticated by the server, receiving, by the server, a third acknowledgment response that is associated with the second seed and the client key; and in response to determining that the second seed is invalid:
initiating a process to re-authenticate the webhook endpoint with the server; and
blocking one or more events that have occurred until the webhook endpoint is re-authenticated with the server.

14. The non-transitory computer-readable storage medium of claim 13, for wherein the one or more programs further include instructions for:
while blocking the one or more events, removing, by the server, a respective set of events from the one or more events, wherein a delivery period for each of the respective set of events has expired.

15. A computer system, comprising:
one or more processors; and
memory storing one or more programs configured to be executed by the one or more processors, the one or more programs including instructions for:
sending, by a server, a first blocking authentication event including a first seed and an expiry timestamp to a webhook endpoint associated with a client;
prior to expiration of a predetermined time period based on the expiry timestamp, receiving, by the server, a first acknowledgement response from the webhook endpoint, wherein the first acknowledgement response is associated with the first seed and an endpoint key;
in response to receiving the first acknowledgment response, authenticating, by the server, the webhook endpoint;
generating, by the server, a second seed;
sending, by the server, a first event with the second seed to the webhook endpoint; and
receiving, by the server, a second acknowledgment response from the webhook endpoint, wherein the second acknowledgement response is associated with the second seed and the endpoint key.

16. The computer system of claim 15, wherein the one or more programs further include instructions for:
generating, by the server, a third seed;
sending, by the server, a second authentication event including the third seed and the expiry timestamp to the webhook endpoint; and
in response to receiving a third acknowledgement response associated with the first or the third seed, authenticating, by the server, the webhook endpoint.

17. The computer system of claim 15, wherein the one or more programs further include instructions for:
prior to receiving, by the server, the first acknowledgement response from the webhook endpoint, forgoing sending the first event.

18. The computer system of claim 15, wherein:
the first seed has a first amount of time before expiration,
the second seed has a second amount of time before expiration that is more than the first amount of time before expiration, and
the first event with the second seed is sent to the webhook endpoint before the first amount of time before expiration is less than or equal to zero.

19. The computer system of claim 15, wherein the one or more programs further include instructions for:
receiving, by the server, a third acknowledgment response that is associated with the second seed and the endpoint key; and
in response to determining that the second seed is invalid:
initiating a process to re-authenticate the webhook endpoint with the server; and
blocking one or more events received by the server until the webhook endpoint is authenticated with the server.

20. The computer system of claim 19, wherein the one or more programs further include instructions for:
while blocking the one or more events, removing, by the server, a respective set of events from the one or more events, wherein a delivery period for each of the respective set of events has expired.

* * * * *

UNITED STATES PATENT AND TRADEMARK OFFICE
CERTIFICATE OF CORRECTION

PATENT NO. : 12,301,739 B2
APPLICATION NO. : 18/086626
DATED : May 13, 2025
INVENTOR(S) : Ji Huang et al.

Page 1 of 1

It is certified that error appears in the above-identified patent and that said Letters Patent is hereby corrected as shown below:

In the Claims

Column 15; Line No. 12 (Claim 14): Replace "claim 13, for wherein the" with: --claim 13, wherein the--.

Signed and Sealed this
Twenty-sixth Day of August, 2025

Coke Morgan Stewart
*Acting Director of the United States Patent and Trademark Office*